United States Patent [19]

Burdoin

[11] Patent Number: 5,083,279

[45] Date of Patent: Jan. 21, 1992

[54] CANARD BASED HIGH ANGLE OF ATTACK AIR DATA SENSOR

[75] Inventor: Robert B. Burdoin, Albuquerque, N. Mex.

[73] Assignee: Honeywell, Inc., Minneapolis, Minn.

[21] Appl. No.: 521,018

[22] Filed: May 9, 1990

[51] Int. Cl.$^5$ .............................................. G06F 15/50
[52] U.S. Cl. .................................... 364/435; 340/967; 244/45 A; 244/181
[58] Field of Search ............... 364/428, 435; 340/966, 340/967, 968; 244/45 A, 76 R, 178, 181

[56] References Cited

U.S. PATENT DOCUMENTS

| | | | |
|---|---|---|---|
| 4,027,839 | 6/1977 | Quinlivan | 364/435 |
| 4,046,341 | 9/1977 | Quinlivan | 364/435 |
| 4,598,888 | 7/1986 | Béteille | 364/435 |
| 4,723,214 | 2/1988 | Frei | 364/435 |
| 4,769,759 | 9/1988 | McGough | 364/435 |

OTHER PUBLICATIONS

Journal of Spacecraft and Rockets, "Innovative Air Data System for the Space Shuttle Orbiter", C. David Pruett, Henry Wolf, Michael Heckt, vol. 30, No. 1, Jan.-Feb. 1983.

*Primary Examiner*—Gary Chin
*Attorney, Agent, or Firm*—Haugen and Nikolai

[57] ABSTRACT

A canard based air speed, angle of attack and sideslip measurement system consisting of canard mounted pressure transducers. The canard includes a leading edge, a side surface, a bottom surface and a top surface. The apparatus includes pressure sensors including a plurality of flush orifice pressure sensors mounted on the canard further including a first configuration of pressure sensors flush mounted on the side surface, a second configuration of pressure sensors flush mounted on the bottom surface, a third configuration of pressure sensors mounted on the top surface, and a fourth configuration of pressure sensors mounted on the leading edge and wherein each pressure sensors provides an output signal and the combinations of all of the output signals are proportional to the angles of attack of the aircraft. A shaft encoder provides displacement angles for the canard.

13 Claims, 6 Drawing Sheets

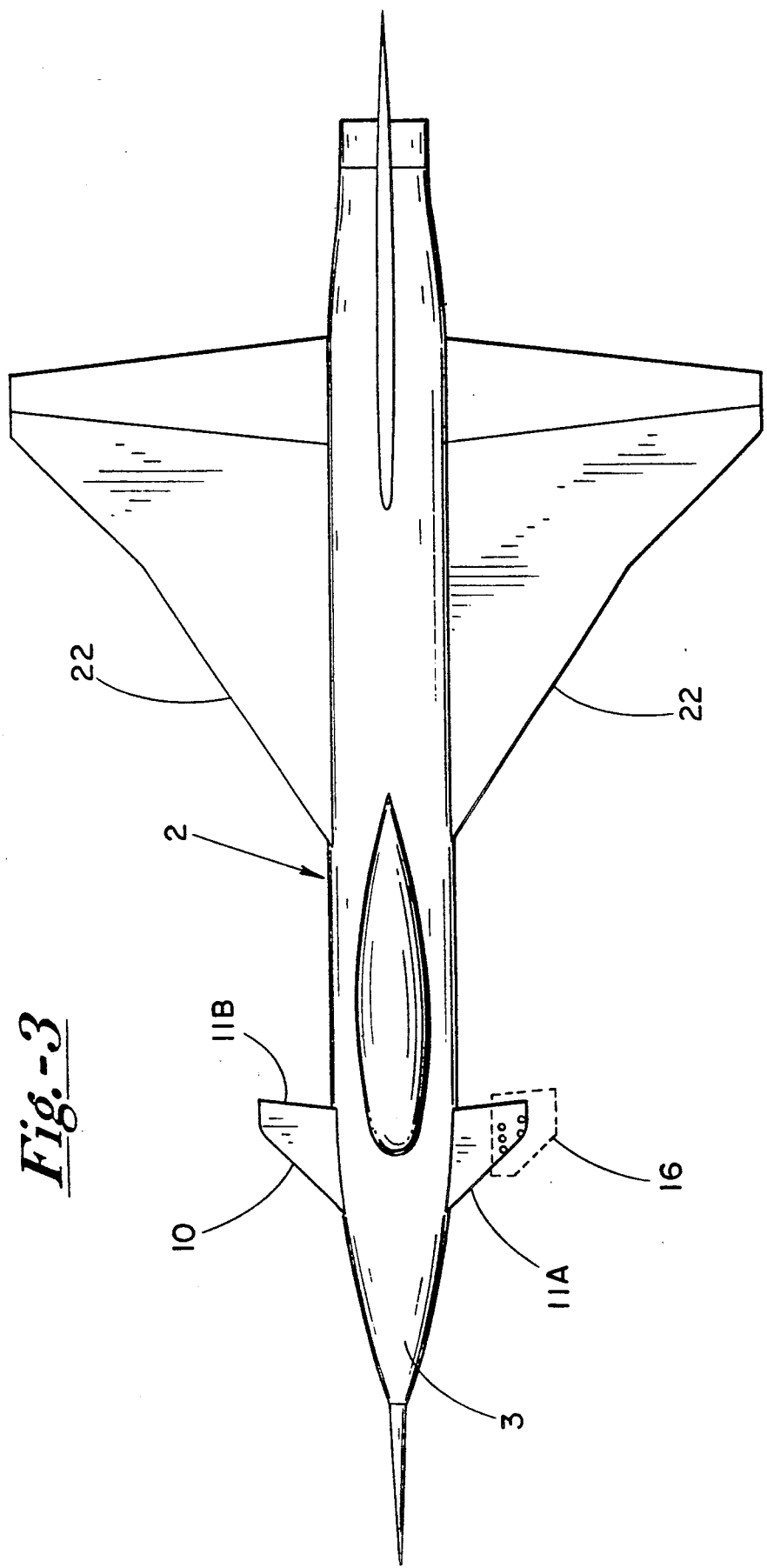

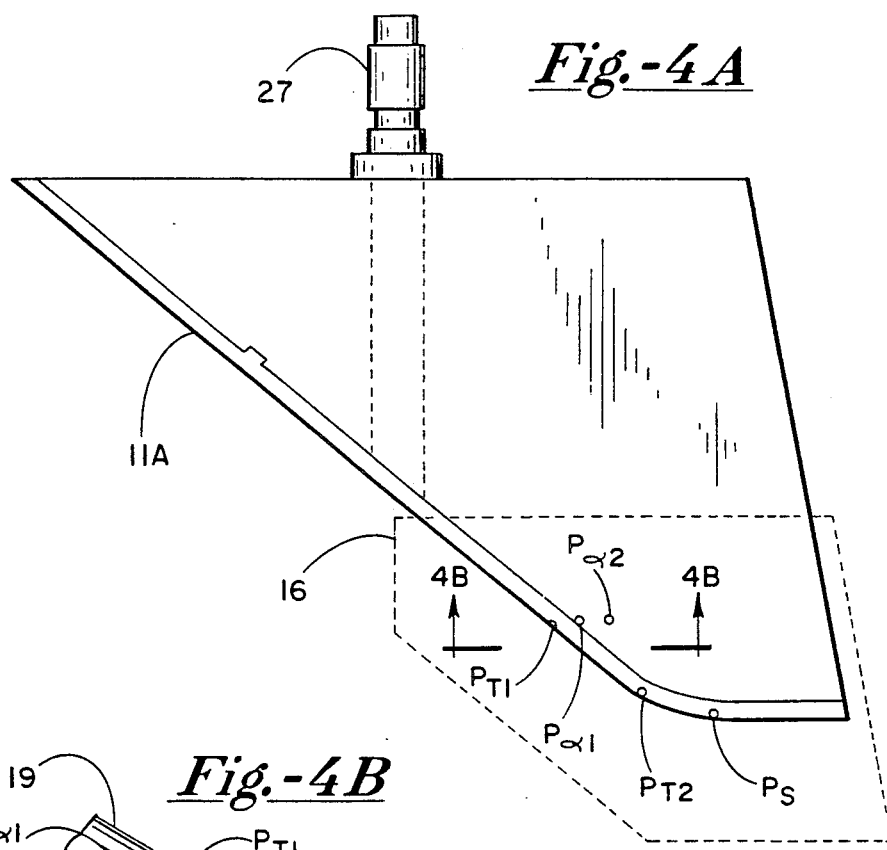
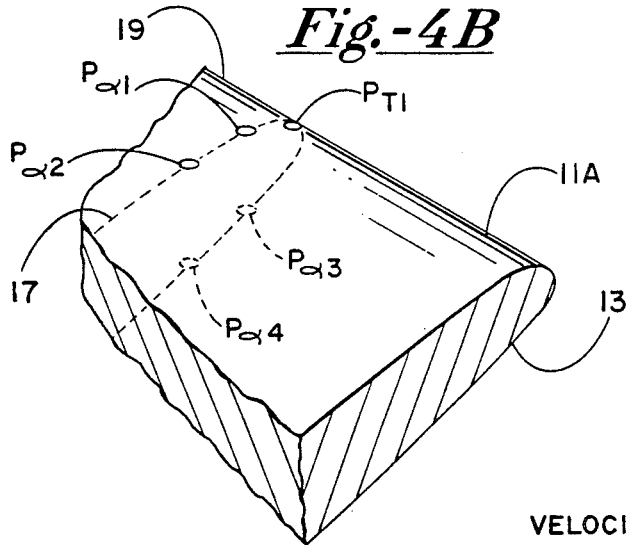
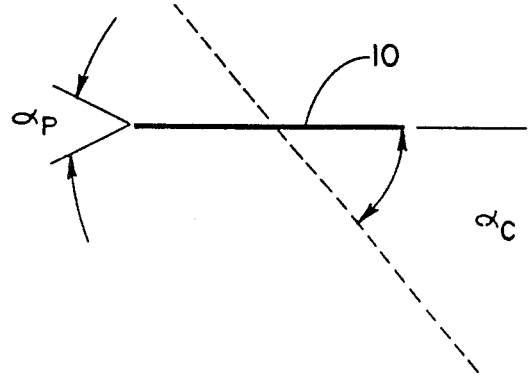

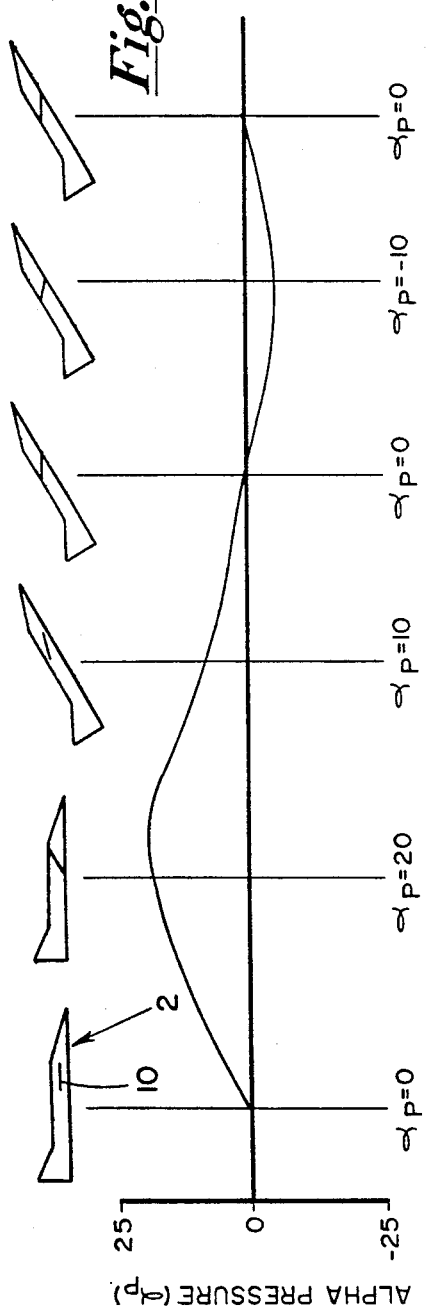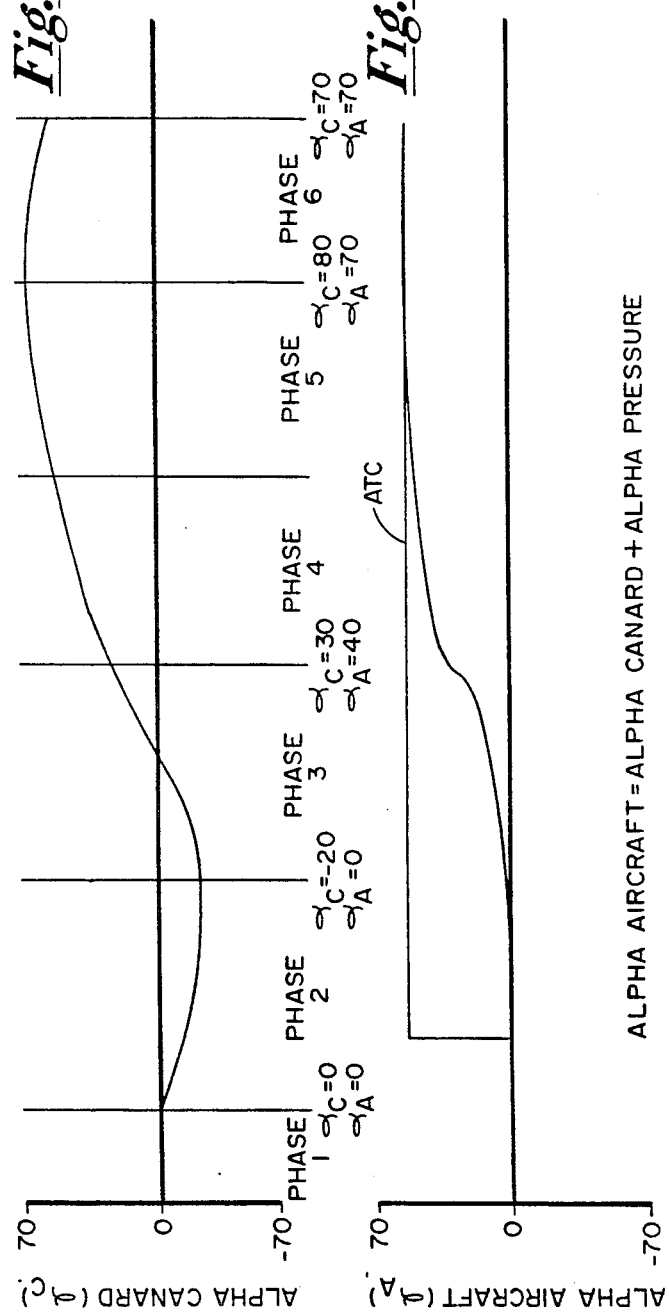

CANARD BASED HIGH ANGLE OF ATTACK AIR DATA SENSOR

BACKGROUND OF THE INVENTION

This invention relates to air data sensors, and, more particularly, to a canard based air speed, angle of attack and sideslip measurement system.

Future aircraft will require controlled highly instantaneous 3-dimensional maneuvers in the post stall regime. Such maneuvers require air data parameters to be measured throughout the flight regime. Prior art solutions to air data measurements in the post stall regime, specifically measurements of angle of attack and sideslip, typically use a differential pressure probe, this approach does not measure air data parameters sufficiently accurately at high angle of attack. Prior art systems induce unacceptable amounts of pneumatic lag, and/or an additional appendage jutting into the air stream, which adversely affect aircraft performance.

FIG. 1 shows the situation of two aircraft maneuvering for position. Aircraft 1 does not incorporate a canard in the forward part of the fuselage. Aircraft 2 does incorporate a canard 10. To maneuver for an advantageous position aircraft 1 must perform a relatively wide sweeping motion where aircraft 2 can use the canard 10 to enter the post stall region and quickly make a turn, out maneuvering aircraft 1. The advantage of a canard, that of quick turning and supermaneuverability, dictates the need for a high angle of attack and side slip measurement system.

FIG. 2 shows graphically the greatly improved turning radius of a canard equipped aircraft as compared to a conventional aircraft. Arrow 12 on plot B indicates the aircraft turning tightly using the stall canard technique and arrow 14 on plot A indicates the aircraft using the conventional flight turn technique. The canard equipped aircraft thus enjoys a greater freedom of motion.

An air data parameter measurement system according to the invention can be advantageously employed in a aircraft whose post stall maneuvering capabilities exceed those of conventional aircraft which typically have a 20° angle of attack capability. In such an application the ability to measure air speed, angle of attack and side slip is crucial. Such supermaneuverable aircraft will be able to perform small radius turns with a 90° angle of attack capability. Such aircraft will also be able to fly at super high angles-of-attack in the post stall regime safely because accurate side slip measurements will be available to warn of excessive yaw.

SUMMARY OF THE INVENTION

The invention provides a canard based air speed, angle of attack and sideslip measurement system consisting of canard mounted pressure transducers. The canard includes a leading edge, a side surface, a bottom surface and a top surface. The apparatus includes pressure sensors including a plurality of flush orifice pressure sensors mounted on the canard. The plurality of pressure sensors further include a first configuration of pressure sensors flush mounted on the side surface, a second configuration of pressure sensors flush mounted on the bottom surface, a third configuration of pressure sensors mounted on the top surface, and a fourth configuration of pressure sensors mounted on the leading edge. Each pressure sensor provides an output signal and the combination of all of the output signals is proportional to the angles of attack of the aircraft. A shaft encoder provides displacement angles for the canard.

In one aspect of the invention a processor is coupled to the shaft encoder and the first and second configuration of flush mounted pressure sensors. The processor sums the output signals of the shaft encoder and the first and second configuration to determine the true angle of attack of the aircraft.

It is one object of this invention to measure canard based air data parameters extending throughout an aircraft flight regime.

It is a further object of the invention to provide measured air data parameters including: air speed, angle of attack and sideslip.

It is yet another object of the invention to provide a sensor apparatus for measuring air data parameters when the flight regime includes angles of attack ranging from about −180° to about +180° and side slip (also called 'yaw') of about −90° to about +90°.

More specifically, it is an object of the invention to measure air data parameters for the aircraft upon which the canard is attached.

It is another object of the invention to provide a canard air data parameter measurement system, wherein the canard functions both as a pitot-static probe and as a differential pressure flow direction sensor.

It is yet another object of the invention to provide an air data parameter measurement system wherein flush mounted orifice pressure transducers are advantageously employed.

In one feature of the invention the surface pressure distribution is sampled as an array of orifices on the leading and side edges, as well as the top and bottom surfaces, of the canard to provide stagnation (total) pressure and canard attitude data.

BRIEF DESCRIPTION OF THE DRAWINGS

To illustrate the invention, a preferred embodiment of this invention will be described hereinafter with reference to the accompanying drawings. The preferred embodiment concerns a canard based flush orifice pressure sensor array with corresponding pressure information processing system with the canard attached to the relative water line of the aircraft.

FIG. 3 shows an aircraft having a canard from a top view, showing the position of the canard relative to the aircraft.

FIGS. 4A and 4B show a more detailed illustration of a canard employing flush mounted sensors located in the leading and side edges of the canard and mounted on the top and the bottom of the canard as provided in one embodiment of the invention.

FIG. 5 shows the relationship between the canard angle of attack and the aircraft angle of attack.

FIGS. 6A, 6B, and 6C show an example of a flight regime in the post stall region and the angular relationships between the canard angle of attack and the angle of attack of the aircraft wings.

DESCRIPTION OF THE PREFERRED EMBODIMENT

Figure 1:
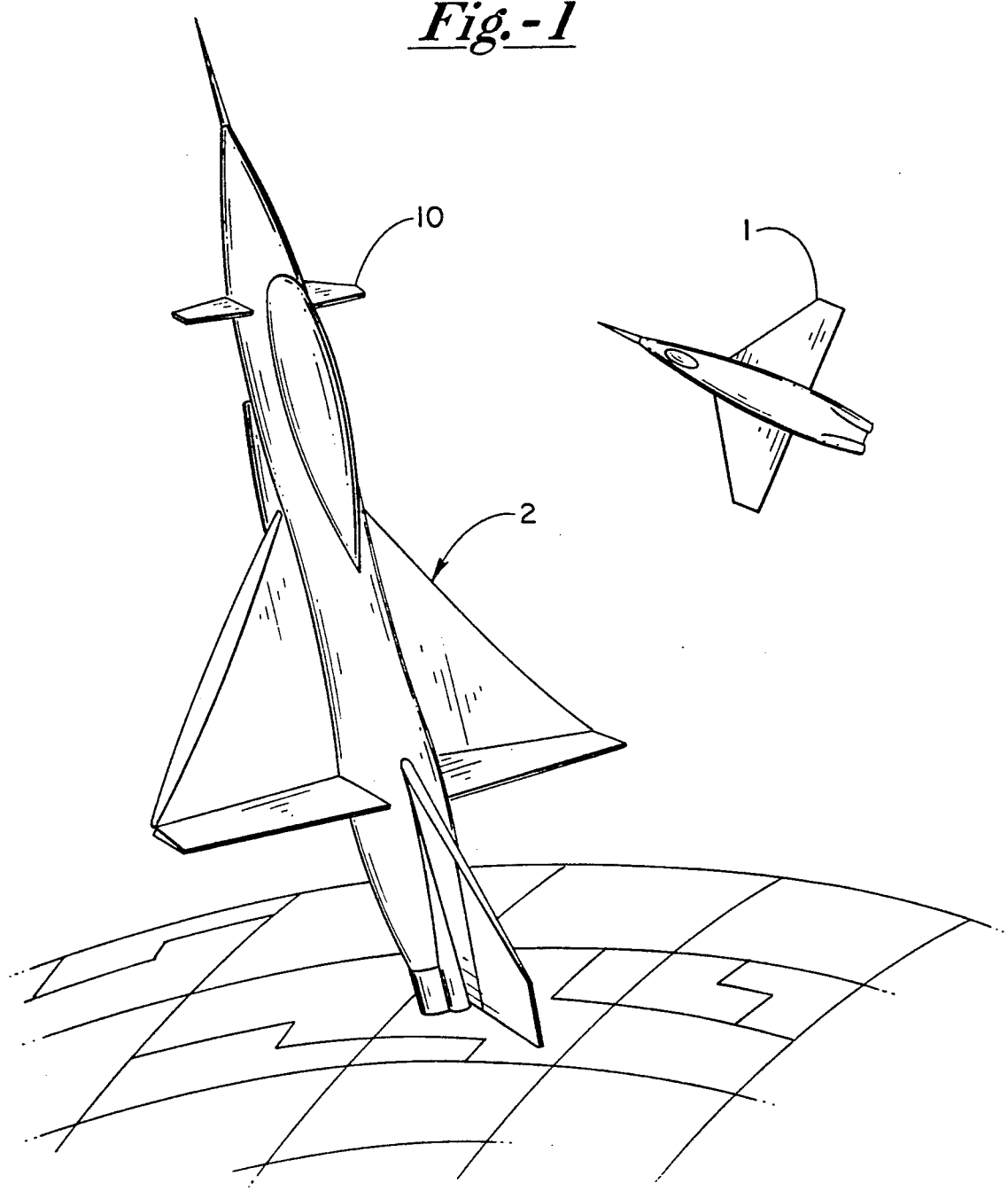
FIG. 1 shows a general view of the situation of a supermaneuverable aircraft flying in the post stall region utilizing a canard.
Figure 2:
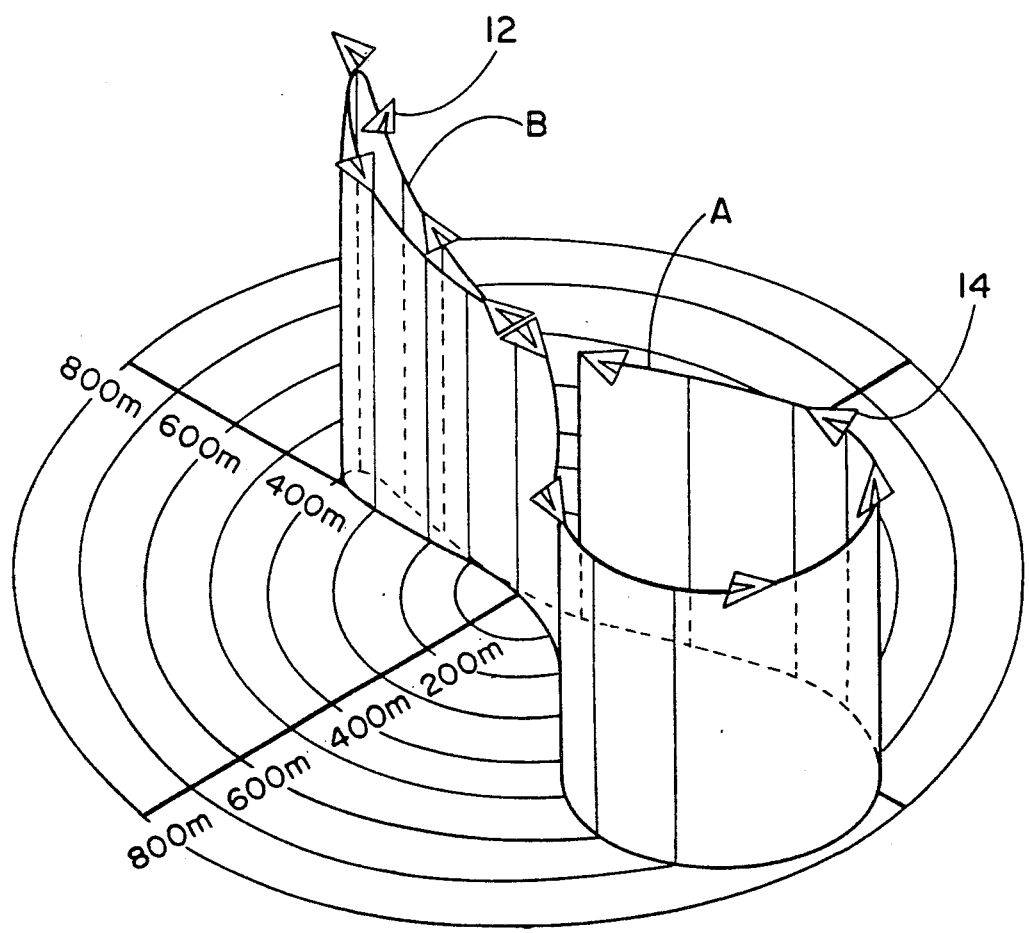
FIG. 2 shows graphically the tremendously improved turning radius of a supermaneuverable aircraft over a conventional aircraft.

Referring now to FIG. 3, a typical aircraft 2 having a canard 10 and a fuselage 3 is shown from a top view illustrating the position of the canard 10 relative to the aircraft. The canard 10 has starboard and port members 11A and 11B which are joined by a shaft (not shown). Those skilled in the art will appreciate that this is only an illustration of one example of canard placement and that other configurations are possible. For example, wings 22 may be located aft of the canard 10 on some aircraft. In accordance with one embodiment of the invention, a plurality of flush orifice sensors 20 may be mounted on the canard. Broken line 16 generally shows the area of the canard used in one embodiment of the invention to mount the flush orifice sensors.

FIGS. 4A and 4B show the positions of the flush mounted pressure sensors employed in one example embodiment of the invention in more detail. FIG. 4A is a top view of canard member 11A and shows the positions of pressure sensors $P_{T1}$, $P_{a1}$, $P_{a2}$, $P_{T2}$ and $P_s$. Also shown is a portion of the canard shaft 27. FIG. 4B is an isometric view of canard member 11A. In addition to the sensors shown in FIG. 4A, FIG. 4B illustrates the positions of pressure sensors $P_{a3}$ and $P_{a4}$ which are located, in this example, on the underside 13 of canard member 11 The pressure sensors $P_{a1}$, $P_{a2}$ $P_T$, $P_{a3}$ and $P_{a4}$ are preferably symmetrically aligned along broken line 17 which passes through the midpoints of the pressure sensors. Note that $P_{a2}$ and $P_{a4}$ are preferably arranged to be spaced a first equal distance away from the canard edge 19. Similarly $P_{a1}$ and $P_{a3}$ are spaced a second equal distance from the edge so as to be aligned with each other in the vertical direction. It will be appreciated by those skilled in the art that the above description is intended by way of explanation of the invention and not by way of limitation. Other sensor formations, employing different numbers of sensors may be employed in various applications of the invention. As shown in detail in FIG. 4A, the sensors P are advantageously positioned on the canard to be far enough away from the fuselage 3 and in front of the wings 22 to receive mostly undisturbed air in aircraft flight. In one embodiment of the invention, a set of seven sensors is preferably employed. The seven sensors include two sensors configured or arrayed to measure yaw/side slip and five sensors configured to measure angle of attack. Each sensor is labeled as shown in Table I

TABLE I

| Sensor | Location | Sensed Parameter |
|---|---|---|
| 1. $P_{T1}$ | Orifice on Leading edge of canard | AOA |
| 2. $P_{T2}$ | Orifice on outside leading edge of canard | YAW |
| 3. $P_{a1}$ | Most forward orifice on upper part of canard | AOA |
| 4. $P_{a2}$ | Trailing orifice on upper part of canard | AOA |
| 5. $P_{a3}$ | Most forward orifice on lower part of canard | AOA |
| 6. $P_{a4}$ | Trailing orifice on lower part of canard | AOA |
| 7. $P_s$ | Side edge orifice | YAW | where AOA is the angle of attack parameter for the canard and YAW is the side slip parameter. Off the shelf dual transducers may advantageously be used for the flush orifice sensors. One such conventional sensor which may be suitably used in the invention is a dual pressure sensor, part number 26000891, as manufactured by Honeywell Inc. of Minneapolis, Minn.

Referring now to FIG. 5 the relationship between canard angle of attack and the aircraft angle of attack is graphically illustrated. The water line of the aircraft is represented as dotted line WL. The measured pressure angle of attack is shown as $a_P$. The displacement angle of the canard axis referenced from the water line of the aircraft is shown as $a_C$. The angle of attack of the aircraft $a_A$ is then computed from the algebraic addition of the measured pressure angle of attack and the displacement angle of the canard axis as follows: $a_A = a_P + a_C$. Those skilled in the art having the benefit of this disclosure will understand that a conventionally arranged shaft encoder on the canard assembly will advantageously provide the displacement angel of the canard axis.

Figure 7:
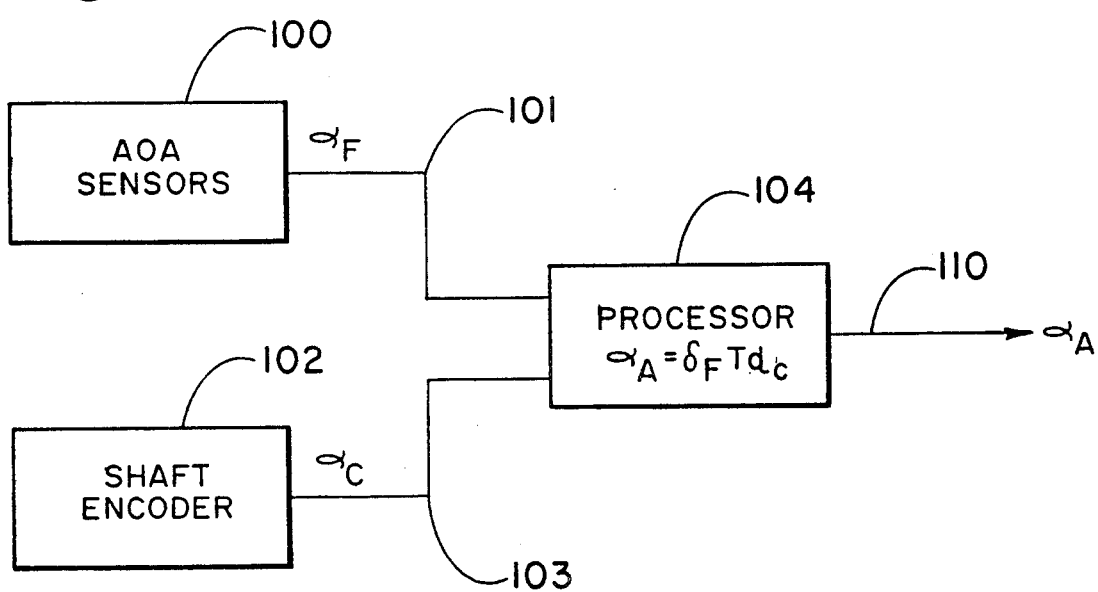
FIG. 7 is a block diagram of one embodiment of the invention.

FIG. 7 is a block diagram showing one arrangement for calculating the aircraft angle of attack using information from the AOA sensors 100 added to data from the shaft encoder 102. The AOA sensors $P_{T1}$, $P_{a1}$, $P_{a2}$, $P_{a3}$ and $P_{a4}$. The outputs from these sensors are carried on line 101 to processor 104. The shaft encoder 102 is structured and arranged on the canard shaft in a conventional manner and may be a conventional encoder style such as an optical encoder which is well known in the art. The output of the shaft encoder is carried on line 103 to the processor 104 wherein the equation $a_A = a_P + a_C$ is executed using the inputs from AOA sensors 100 and shaft encoder 102. The output of processor 104 is the angle of attack of the aircraft $a_A$ on line 110.

Now referring to FIGS. 6A, 6B and 6C, an aircraft 2 executing a stall maneuver is shown graphically. There are six phases to the post stall maneuver as indicated and each of the graphs 6A, 6B and 6C are correlated to the phases as indicated.

FIG. 6C shows the angle of attack ($a_A$) of the aircraft during each phase of the post stall maneuver. Similarly, the aircraft positions shown above FIG. 6A illustrate the angle of attack of the canard 10 relative to the aircraft and FIG. 6A further shows the measured pressure angle of attack of the canard relative to the axis. FIG. 6B shows the canard angle of attack. In the example shown, line ATC in FIG. 6C represents a desired aircraft angle of attack which has been commanded by the aircraft control system and the resultant aircraft angle of attack which is calculated from the algebraic summation of angle of attack of the canard ($a_C$) and measured canard pressure ($a_P$). The various phases illustrate how the aircraft arrives at the commanded angle of attack by using the canard. In phase 1 the aircraft is in level flight and the angle of attack of the aircraft is zero, resulting from the displacement angle of the canard axis being zero added to the angle of attack of the canard which is also zero.

In phase 2 the ATC command has been entered and the canard axis is rotated approximately −20°. In phase 3, the aircraft has increased its angle of attack sufficiently to begin to decrease the displacement angle of the canard. The angle of attack of the aircraft is highly positive resulting from the displacement angle of the canard axis moving from highly negative to positive, added to the angle of attack of the canard which is returning to zero but is still positive.

In phase 4 the aircraft has increased its angle of attack to where it can proceed under vectored thrust. The displacement angle of the canard axis has allowed the aircraft to maintain a point of vectored thrust stability. The angle of attack of the aircraft is highly positive, resulting from the highly positive displacement angle of the canard axis added to the angle of attack of the canard which is almost back to zero. In phases 5 and 6, the aircraft is stabilized at its new angle of attack, which matches the commanded angle of attack.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A canard based high angle of attack air data sensor apparatus for an aircraft having a canard, wherein the canard includes a shaft, a leading edge, a side surface, a bottom surface and a top surface, comprising:
   (a) means for sensing pressure including a plurality of flush orifice pressure sensors mounted on the canard wherein the pressure sensors further include a first configuration of pressure sensors flush mounted on the side surface, a second configuration of pressure sensors flush mounted on the bottom surface, a third configuration of pressure sensors flush mounted on the top surface, and a fourth configuration of pressure sensors flush mounted on the leading edge, and wherein each pressure sensor provides an output signal;
   (b) a shaft encoder mounted on the canard shaft which provides a measurement signal proportional to the displacement angle of the canard; and
   (c) means for processing coupled to the means for sensing pressure and the shaft encoder, where the means for processing determines an angle of attack of the aircraft as a function of the output signals of the second, third, and fourth configuration of pressure sensors and the measurement signal.

2. The apparatus of claim 1 wherein the plurality of pressure sensors includes at least seven sensors.

3. The apparatus of claim 2 wherein the first configuration of pressure sensors includes at least two of said pressure sensors and is disposed to measure aircraft side slip.

4. The apparatus of claim 3 wherein the second, third and fourth configurations of the pressure sensors cooperatively measure pressure parameters proportional to the angle of attack of the canard.

5. The apparatus of claim 4 wherein the second configuration of pressure sensors comprises at least two of said pressure sensors.

6. The apparatus of claim 5 wherein the third configuration of sensors comprises at least two of said pressure sensors vertically aligned with the second configuration of pressure sensors.

7. The apparatus of claim 6 wherein the fourth configuration of pressure sensors comprises at least one of said pressure sensors.

8. The apparatus of claim 7 wherein the aircraft includes wings and a fuselage and wherein the plurality of pressure sensors are positioned on the canard in front of the aircraft wings at a distance from the fuselage far enough away from the fuselage so as to enable the sensors to receive generally undisturbed air when the aircraft is in flight.

9. A canard based high angle of attack air data sensor apparatus for an aircraft having a canard, wherein the canard includes a shaft, an edge, a side surface, a bottom surface and a top surface, comprising:
   (a) a first array of flush orifice pressure sensors mounted on the top surface;
   (b) a second array of flush orifice pressure sensors mounted on the bottom surface;
   (c) a third array of flush orifice pressure sensors mounted on the canard edge;
   (d) a shaft encoder mounted on the canard shaft which provides a course signal proportional to the displacement angle of the canard; and
   (e) means for processing coupled to the shaft encoder and the first, second and third arrays of flush orifice pressure sensors, where the means for processing determines an angle of attack of the aircraft as a function of the first and second arrays of flush orifice pressure sensors and the course signal.

10. The apparatus of claim 9 wherein the first array of flush orifice pressure sensors comprises at least two dual transducer pressure sensors which are arranged to sense first pressure variations proportional to the angle of attack of the canard.

11. The apparatus of claim 10 wherein the second array of flush orifice pressure sensors comprises at least two dual transducer pressure sensors which are arranged to sense second pressure variations proportional to the angle of attack of the canard.

12. The apparatus of claim 11 wherein the third array of sensors comprise at least two dual transducer pressure sensors which are arranged to sense pressure variations proportional to side slip.

13. A canard based high angle of attack air data sensor apparatus for an aircraft having a canard, wherein the canard includes a shaft, an edge, a side surface, a bottom surface and a top surface comprising:
   (a) a first array of flush orifice pressure sensors mounted on the top surface;
   (b) a second array of flush orifice pressure sensors mounted on the bottom surface;
   (c) a third array of flush orifice pressure sensors mounted on the canard edge;
   (d) a shaft encoder mounted on the canard shaft which provides a course signal proportional to the displacement angle of the canard; and
   (e) a processor coupled to the shaft encoder and the first, second and third arrays of flush orifice pressure sensors wherein each of the first and second arrays of flush orifice pressure sensors have an output proportional to an angle of attack of the canard and the processor operates so as to sum the shaft encoder course signal and the outputs of the first and second arrays to determine the angle of attack of the aircraft.

* * * * *